Oct. 31, 1939. J. M. IRVINE 2,177,718
ELECTRICAL OUTLET SUPPORTING DEVICE
Filed July 1, 1937 3 Sheets-Sheet 1
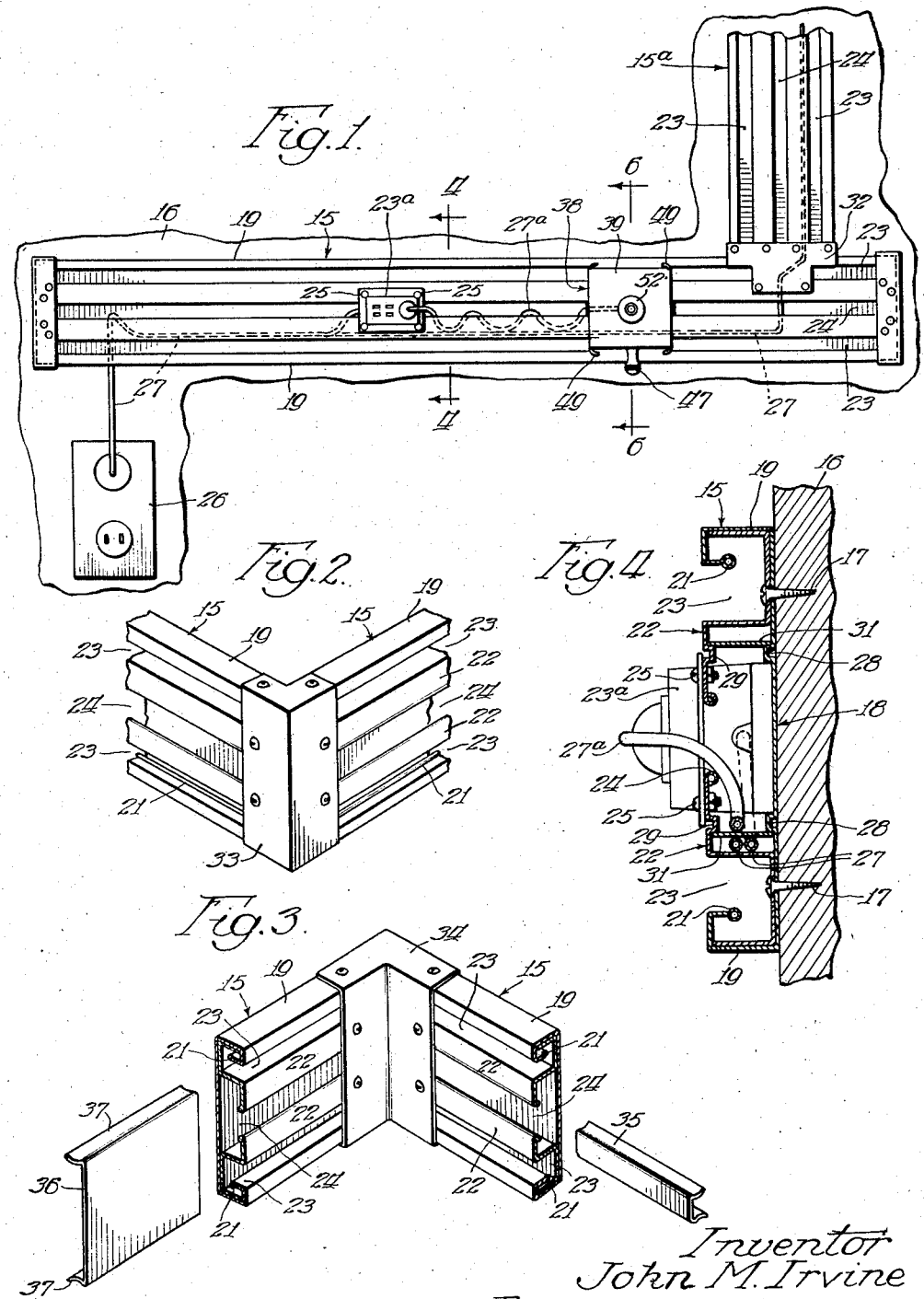
Inventor
John M. Irvine
By Hill & Hill Attys

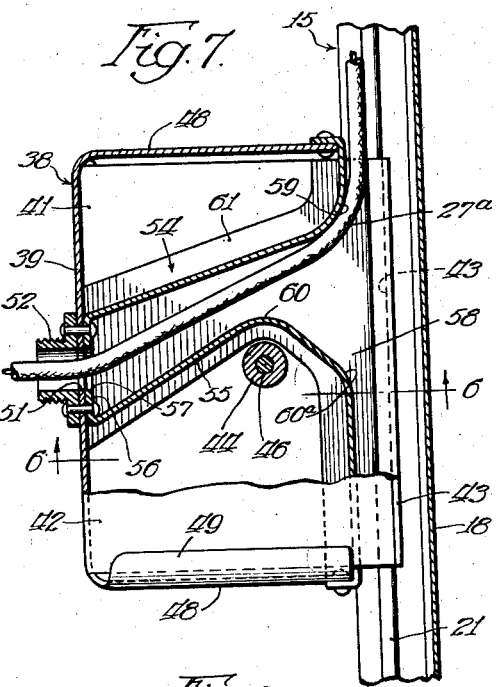
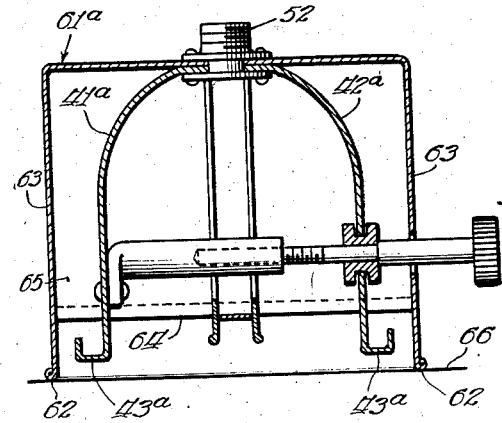
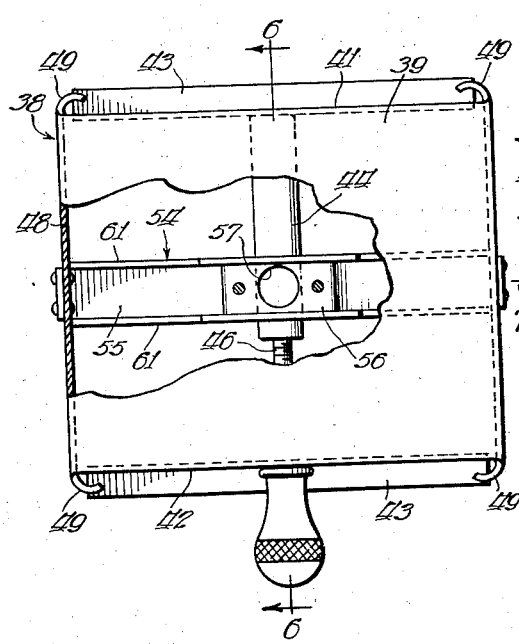
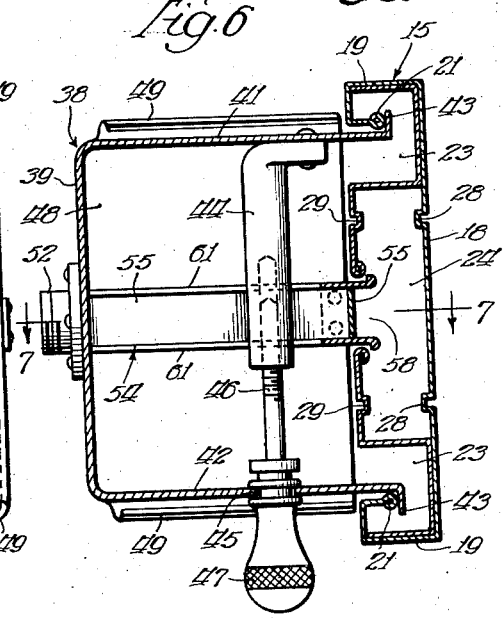

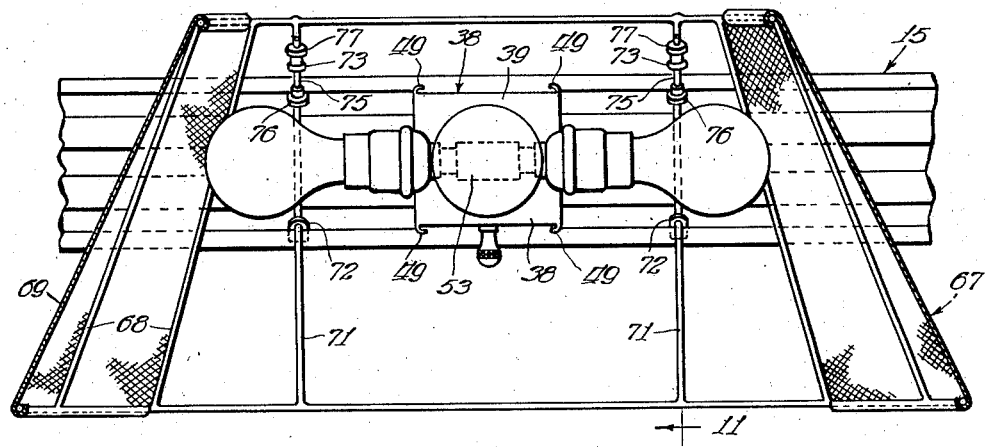
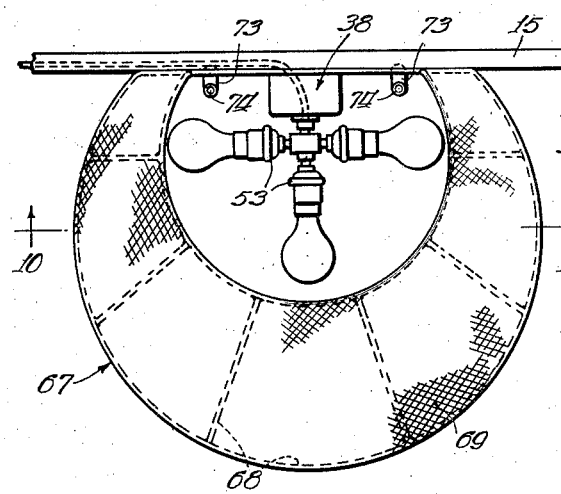
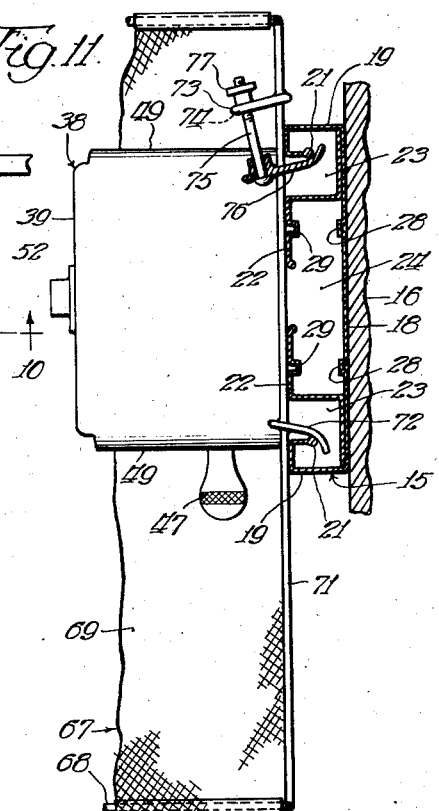
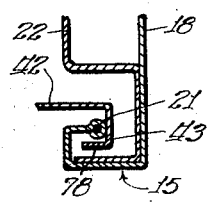

Patented Oct. 31, 1939

2,177,718

UNITED STATES PATENT OFFICE 2,177,718

ELECTRICAL OUTLET SUPPORTING DEVICE

John M. Irvine, Walworth Township, Walworth County, Wis.

Application July 1, 1937, Serial No. 151,445

10 Claims. (Cl. 220—3.9)

This invention relates to supporting devices for electrical outlet brackets and particularly to a structure whereby the brackets and outlets may be positioned at convenient places on the wall, ceiling or floor of a building, room, apartment or the like.

One object of the present invention is to provide a novel construction and arrangement of electrical outlets and support therefor, wherein the wiring or conductors associated with the outlets are concealed from view, and wherein the outlets may be conveniently and readily moved with respect to their support for positioning the outlets in convenient relation to electrically operated devices such, for example, as machines, fan motors, lamps or other electrically operated appliances.

Another object of the invention is to provide novel means for readily securing an outlet bracket to a support in various positions of adjustment with respect thereto.

A further object of the invention is to provide novel means for positioning and supporting the slack in electrical conductors and for preventing accidental contact therewith.

A still further object of the invention is to improve devices of the character described in sundry details hereinafter referred to and particularly pointed out in the appended claims.

One embodiment of the present invention is shown for illustrative purposes in the accompanying drawings, in which:

Fig. 1 is an elevational view of a molding and outlet supporting bracket mounted thereon, the structure shown illustrating features of the present invention;

Fig. 2 is a perspective view illustrating a molding structure adapted to be applied to an outwardly extending corner portion of a wall pilaster or the like, and illustrating a corner member for securing the adjacent ends of the moulding together;

Fig. 3 is an exploded perspective view of a molding structure adapted for mounting in the corner portion of adjacent walls of a room or the like, and illustrating cover or closure members adapted for use in connection with the molding;

Fig. 4 is an enlarged transverse sectional elevational view of the structure illustrated in Fig. 1, and taken substantially as indicated by the line 4—4 thereof;

Fig. 5 is an enlarged front elevational view, having a part thereof broken away, of an outlet supporting bracket illustrated in Fig. 1;

Fig. 6 is a sectional elevational view taken substantially as indicated by the lines 6—6 in Figs. 1, 5 and 7;

Fig. 7 is a plan sectional view taken substantially as indicated by line 7—7 of Fig. 6;

Fig. 8 is a sectional elevational view of an outlet supporting bracket illustrating a slightly modified construction of the housing therefor;

Fig. 9 is a plan view of a fixture and outlet supporting bracket illustrating the relationship of a shade member thereto, the said bracket and shade member being mounted on the bracket supporting molding;

Fig. 10 is an enlarged sectional elevational view of the structure illustrated in Fig. 9, and taken substantially as indicated by the line 10—10 thereof;

Fig. 11 is a further enlarged sectional elevational view taken substantially as indicated by the line 11—11 of Fig. 10; and Fig. 12 is a fragmentary sectional elevational view of a portion of molding illustrating a slightly modified construction of the bracket supporting means in relation thereto.

Referring particularly to Figs. 1 to 7, inclusive, the present invention comprises a molding, indicated as a whole by the numeral 15 adapted to be secured to a wall 16 or other portion of a building structure by means of screws 17 as illustrated in Fig. 4, the molding 15 being shown, in the present instance, as comprising a U-shaped member, indicated as a whole by the numeral 18 provided with laterally extending side portions 19 terminating in inwardly extending edge portions or supporting rails 21 adjacent the longitudinal edge portions of the molding 15. The structure of the molding 15 also includes a pair of frame members 22, which may be spot-welded or otherwise secured to the member 18, extending inwardly from the side portions 19 of the U-shaped member 18 and having portions spaced therefrom to form a pair of longitudinally extending channels 23 adjacent the opposite side portions of the molding 15, and an intermediate channel or slot 24 adjacent the central longitudinal portion thereof.

As illustrated in Figs. 1 and 4, an outlet receptacle 23a may be positioned in the intermediate channel 24 and secured to the frame members 22 by means of screws 25, the receptacle 23a being shown, in the present instance, as connected to a junction box 26 by means of a conductor 27, the conductor 27 being adapted to lie within the channel 24 and be concealed therein, as illustrated in Figs. 1 and 4.

By reference to Fig. 4, it will be noted that the molding 15 is provided with a plurality of pairs of oppositely disposed inwardly extending ribs 28 and 29 formed, respectively, on the U-shaped member 18 and the frame members 22, and that by positioning the conductors 27, for example, at the extreme side portions of the channel 24 and, if desired a partition strip 31 may be placed within the channel and against the ribs 28 and 29 of the respective pairs, in which case the conductors are completely concealed within the molding in a manner to prevent accidental contact or engagement with the conductors.

As illustrated in Fig. 1, a branch or lateral molding 15a may be connected to the molding 15 by a connecting plate 32 for supporting the lateral molding thereon and providing for lateral extension or runs of conductors as may be found desirable.

For connecting transversely extending moldings 15, as illustrated in Fig. 2, an inwardly extending corner plate, indicated at 33 may be employed for securing the adjacent ends of the moldings together.

Fig. 3 illustrates the manner of connecting a pair of transversely extending moldings 15 together in a corner of a room or the like by means of a connector 34 for securing the adjacent ends of the moldings together. At the right hand portion of Fig. 3 is illustrated a fragment of a cover or closure member 35 adapted to close the open side of the intermediate channel 24, while at the left of Fig. 3 is illustrated a cover member 36 having side flanges 37 adapted to be positioned in the channels 23 in a manner to close the channels 23 and also to overlie the intermediate channel 24.

As illustrated in Figs. 5, 6 and 7, the present invention also contemplates a novel outlet supporting bracket indicated as a whole by the numeral 38, and comprising a body portion 39 having relatively movable end portions or members 41 and 42 mounted thereon, the said end portions being provided, respectively, adjacent their free ends, with oppositely disposed laterally extending projections or flanges 43 adapted to engage the supporting rails 21 formed adjacent the longitudinal edge portions of the molding 15 in a manner to support the outlet supporting bracket 38 thereon.

For moving the end portions 41 and 42 relatively to each other for positioning the end portions and projections 43 formed thereon in operative position with respect to the supporting rails 21, the end portion 41 is shown, in the present instance, (Fig. 6), as provided with a screw-threaded sleeve 44 extending toward the end portion 42, and rotatably mounted in an aperture 45 of the end portion 42, is a screw-threaded bolt 46 operatively related to and cooperable at one of its ends with the sleeve 44, and provided at its opposite end with a thumb and finger piece or handle 47 by which the bolt 46 may be rotated with respect to the sleeve 44 in a manner to move the end portions 41 and 42 and the projections 43 formed thereon in opposite directions with respect to each other in a manner to position the projections or flanges 43 within the channels 23, and by manipulating the bolt 46, to move the end portions and projections into operative engagement with the rails 21 for securing the bracket 38 in fixed relation to the molding 15, it being understood that merely by drawing the end members 41 and 42 toward each other, the bracket 38 may be shifted longitudinally of the molding to various positions thereon and again secured in relatively fixed position with respect thereto.

Mounted also on the body portion 39 are a pair of side walls 48 adjacent the respective side edges of the end portions 41, the said side walls having inwardly extending edge portions 49 positioned in the path of movement of the end portions 41 and 42 for limiting the outward movement thereof.

As clearly illustrated in Fig. 7, the body portion 39 is provided with an aperture 51 and a hollow screw-threaded fitting 52 adjacent thereto by which an electrical fixture such, for example, as lamp fixtures 53, illustrated in Figs. 9 and 10, may be mounted, and positioned within the bracket 38 and secured to the body portion 39 thereof is a tubular conductor-guide, indicated as a whole by the numeral 54, and comprising a U-shaped guide strip 55 having a portion 56 provided with an aperture 57 adjacent one end of the conductor guide adapted to register with the aperture 57 formed in the body portion 39 and provided adjacent its opposite end with an elongated aperture 58 adapted to be positioned adjacent and in substantial alignment with the intermediate channel 24 of the molding 15 in a manner to receive the conductors such, for example, as 27a positioned therein, and direct or guide the conductors outwardly therefrom for connection with the electrical lamp fixtures 53 or other electrical appliances, the inner portions of the legs of the guide strip 55 being suitably rounded, as indicated at 59, 60 and 60a, to provide easy curves for the bending of the conductors in a manner to prevent chafing and destroying the insulation thereof, the conductor-guide being provided also with side portions 61 spot-welded or otherwise secured to the adjacent portions 55 of the conductor-guide.

It will be observed from the foregoing description that the present invention provides a novel construction and arrangement whereby outlet supporting brackets may be movably mounted on a molding and conveniently positioned, and secured in fixed relation with respect thereto, and wherein the slack in the conductors may be mounted and suitably concealed in the molding.

The structure illustrated in Fig. 8 is substantially like that illustrated in Figs. 5, 6, and 7 except that the relatively movable end portions 41a and 42a, having the laterally extending projections 43a formed thereon, are surrounded by a housing indicated as a whole by the numeral 61a, the edge portions 62 of the end walls 63 of the housing extending beyond the edge portion 64 of the side walls 65 and beyond the projections 43a of the end portions 41a and 42a in a manner to permit of positioning the bracket illustrated in Fig. 8 on a support such, for example, as a table or the like, indicated by the line 66 in a manner to provide a base for supporting a fixture. The structure illustrated in Fig. 8 is also of such a character as to permit of securing the bracket to a molding in the manner described with reference to the structure illustrated in Figs. 5, 6 and 7.

The construction shown in Figs. 9 to 11, illustrates the application of my improved supporting means to a lamp shade or the like which may be employed in conjunction with the molding member 15 and the lamp fixture 53, the fixture 53 being supported on the molding 15 by means of the supporting bracket 38 after the manner described with reference to Figs. 1 to 7, inclusive.

In the structure illustrated in Figs. 9 to 11, a lamp shade, indicated as a whole by the numeral 67, comprises a skeleton-like frame 68 having a suitable covering 69 mounted thereon, the frame 68 including a pair of supporting bars 71 adapted to be positioned adjacent the molding 15, and shown, in the present instance, as provided with hook-like supporting members 72 rigidly secured to the supporting bars 71 and adapted to engage one of the supporting rails 21 adjacent the edge portion of the molding 15, as clearly illustrated in Fig. 11. Mounted also on the supporting bars 71 in spaced relation to the members 72 is a bracket 73 having an opening 74 formed therein adapted to slidably receive a screw-threaded bolt 75 provided at one of its ends on one side of the bracket 73 with a securing finger 76 adapted to engage the other rail 21 of the molding 15, the opposite end of the bolt being provided with a threaded nut 77 by which the fastening member 76 may be drawn away from the hook-like member 72 and snugly into engagement with the said other rail 21 of the molding 15, as illustrated in Fig. 11. By such an arrangement, it will be apparent that by positioning the hook-like member 72 in relation to one of the rails 21 as shown in Fig. 11, and the fastening member 76 against the other rail, the nut 77 may be rotated to secure the frame 68 and shade member 69 securely to the molding 15, and that by loosening the nut 77, the shade member may be moved along the molding 15 together with the lamp fixture 53 to any desired position.

The fragmentary view shown in Fig. 12 illustrates a slightly modified construction of one of the laterally extending projections or flanges 43 wherein the projection is provided with an additional bent or laterally extending portion 78 in a manner to form a hook-like arrangement for engaging the rail 21 of the molding 15, and whereby when in position with respect thereto, either a spreading of the end portions or members 41 and 42 or the drawing of the end members together will serve to secure the supporting bracket 38 in operative position with respect to the supporting rails 21.

Obviously, the present invention is not limited to the precise construction and arrangement shown and described, as the same may be variously modified. Moreover, all the features of the invention need not be used conjointly, as the same may be used to advantage in variously different combinations and subcombinations.

What I claim as new and desire to secure by Letters Patent is:

1. In a device of the class described and in combination, an elongated molding member having a plurality of substantially parallel laterally spaced channels formed therein and extending longitudinally thereof, supporting rails adjacent the outer longitudinal edge portions of said member, an outlet supporting bracket mounted on and movable longitudinally with respect to said member, a conductor-guide mounted in said bracket and operatively related to one of said channels, and securing means mounted on said bracket and relatively movable in opposite directions into engagement with said rails for securing said bracket to said molding member.

2. In a device of the class described and in combination, an elongated molding member having a plurality of substantially parallel laterally spaced channels formed therein adjacent the respective longitudinal edge portions of said member and having a conductor-receiving channel adjacent the central longitudinal portion thereof, supporting rails adjacent the outer longitudinal edge portions of said member and adjacent the respective first-mentioned channels, an outlet supporting bracket mounted on and movable longitudinally with respect to said member, a tubular conductor-guide mounted in said bracket and having an open end portion communicating with said last-mentioned channel, and manually operated securing means mounted on said bracket and relatively movable in opposite directions into engagement with said rails for securing said bracket to said molding member.

3. In a device of the class described and in combination, an elongated molding member having a plurality of substantially parallel laterally spaced channels formed therein adjacent the respective longitudinal edge portions of said member and having an intermediate conductor-receiving channel adjacent the central longitudinal portion of said member, supporting rails adjacent the outer longitudinal edge portions of the member adjacent the respective first-mentioned channels, an outlet supporting bracket mounted on and movable longitudinally with respect to said member, a tubular conductor-guide mounted in said bracket and having an elongated open end portion in substantial alignment and communicating with said intermediate channel, and oppositely disposed manually operated securing means mounted on said bracket and relatively movable in opposite directions into engagement with said rails for securing said bracket to said molding member.

4. In a device of the class described and in combination, an elongated molding member having a plurality of substantially parallel laterally spaced outer channels formed therein adjacent the respective longitudinal edge portions of said member and having an intermediate conductor-receiving channel adjacent the central longitudinal portion of said member, a plurality of pairs of oppositely disposed ribs extending into said intermediate channel at opposite sides thereof, supporting rails formed on the outer longitudinal edge portions of the member and extending into said outer channels, an outlet supporting bracket mounted on and movable longitudinally with respect to said member, a tubular conductor guide mounted in said bracket and having an elongated open end portion in substantial alignment and communicating with said intermediate channel, oppositely disposed manually operated securing means mounted on said bracket and extending into the respective outer channels, said securing means being relatively movable in opposite directions into engagement with said rails for securing said bracket to said molding member, and partition strips adapted to be positioned in said intermediate channel adjacent the respective pairs of said ribs.

5. An outlet supporting bracket comprising a body portion, oppositely disposed spaced end portions mounted on said body portion and relatively movable with respect thereto, laterally extending projections on said end portions, and manually operated cooperable means mounted on the respective end portions for moving said end portions and projections relatively with respect to each other.

6. An outlet supporting bracket comprising a body portion, oppositely disposed spaced end portions formed integrally with said body portion and relatively movable with respect to each other and to said body portion, laterally extending projections on said end portions, oppositely disposed side members mounted on said body portion and positioned adjacent the respective edges of said end portions, and manually operated cooperable means mounted on the respective end portions for moving said end portions and projections relatively with respect to each other.

7. An outlet supporting bracket comprising a body portion, oppositely disposed end portions mounted on said body portion and relatively movable with respect to each other and to said body portion, laterally extending projections on said end portions, oppositely disposed side members mounted on said body portion and positioned adjacent the respective edges of said end portions, manually operated cooperable means mounted on the respective end portions for moving said end portions and projections relatively in opposite directions with respect to each other, and inwardly extending edge portions on said side members adapted to be engaged by said end portions for limiting the movement thereof.

8. An outlet supporting bracket comprising a body portion having an outlet opening therein, oppositely disposed end portions mounted on said body portion and relatively movable with respect to each other and to said body portion, laterally extending projections on said end portions, oppositely disposed side members mounted on said body portion adjacent the respective edges of said end portions, manually operated screw-threaded means mounted on the respective end portions and cooperable to move said end portions and projections relatively in opposite directions with respect to each other, inwardly extending edge portions on said side members adapted to be engaged by said end portions for limiting the movement thereof, and a tubular conductor-guide mounted on said body portion and having an opening at one of its ends in register with the opening in said body portion and having an elongated opening adjacent its opposite end.

9. A supporting bracket comprising a body portion, oppositely disposed end members mounted on said body portion, laterally extending projections on the respective end members, a threaded sleeve mounted on one of said end members, a threaded bolt rotatably mounted on the other of said members and operatively related to said sleeve for moving said members and the respective projections thereon relatively to each other, and a conductor-guide mounted on said body portion between said end members.

10. A supporting bracket comprising a body portion, oppositely disposed relatively movable resilient members mounted on said body portion, laterally extending projections on the respective members, a threaded sleeve mounted on one of said members, a threaded bolt rotatably mounted on the other of said members and operatively related to said sleeve for moving said members and the respective projections thereon in opposite directions relatively to each other, a conductor-guide mounted on said body portion between said members and a housing surrounding said members and guide, the walls of said housing adjacent said members extending beyond the edge portions of the adjacent side walls of the housing.

JOHN M. IRVINE.